United States Patent [19]
Woodrum

[11] 3,921,143
[45] Nov. 18, 1975

[54] MINIMAL REDUNDANCY ENCODING METHOD AND MEANS

[75] Inventor: Luther Jay Woodrum, Poughkeepsie, N.Y.

[73] Assignee: International Business Machines Corporation, Valhalla, N.Y.

[22] Filed: Dec. 26, 1973

[21] Appl. No.: 428,543

Related U.S. Application Data

[63] Continuation of Ser. No. 213,604, Dec. 29, 1971, abandoned.

[52] U.S. Cl. ........................ 340/172.5; 340/347 DD
[51] Int. Cl.$^2$ ........................ G06F 3/00
[58] Field of Search .................. 340/172.5, 347 DD

[56] References Cited

UNITED STATES PATENTS

| | | | |
|---|---|---|---|
| 3,016,527 | 1/1962 | Gilbert | 340/347 DD |
| 3,051,940 | 8/1962 | Fleckenstein | 340/347 DD |
| 3,185,823 | 5/1965 | Ellersick | 340/347 DD |
| 3,185,824 | 5/1965 | Blasbalg | 340/172.5 |
| 3,413,611 | 11/1968 | Pfuetze | 340/172.5 |
| 3,675,212 | 7/1972 | Raviv | 340/172.5 |

*Primary Examiner*—Charles E. Atkinson
*Attorney, Agent, or Firm*—Bernard M. Goldman

[57] ABSTRACT

Generating electric signals representing a minimal-redundancy encoded variable-length output character from each received input character. A sequentially scanable device T has its bit positions set with a sequence of electric signals derived from a left list scan of a binary tree representing the minimal redundancy code. Each bit position in device T corresponds to a respective vertex in the scanned tree; and in each bit position is set to one of two electrical states for indicating an inner vertex or a sink in the tree. Each input character is initially provided as an electrical signal representing the sequence number of the input character in its character set. For each input character, a sequential scan is made of the bit positions in device T, during which its sink positions are counted up to an ending sink position determined when the sink count reaches the sequence number of the current input character. A corresponding output character is generated as a set of electrical signals comprising a binary tree path vector to the ending sink position by electrically sensing the inner vertex and sink bit positions in device T up to the ending sink position.

4 Claims, 13 Drawing Figures

FIG. 1A
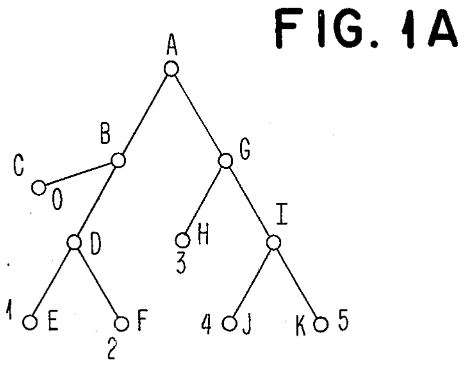
FIG. 1B
| SINK | K | BYTE |
|---|---|---|
| C | 0 | 0 1 1 0 0 1 1 0 |
| E | 1 | 1 1 0 0 1 0 1 0 |
| F | 2 | 1 0 1 1 0 1 1 0 |
| H | 3 | 0 1 1 1 0 1 1 1 |
| J | 4 | 1 0 0 0 1 0 0 0 |
| K | 5 | 1 1 0 0 0 1 1 1 |
FIG. 1C
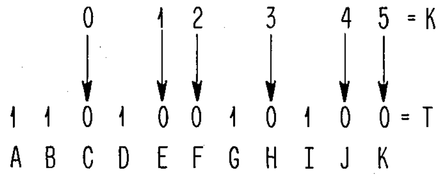
FIG. 1D
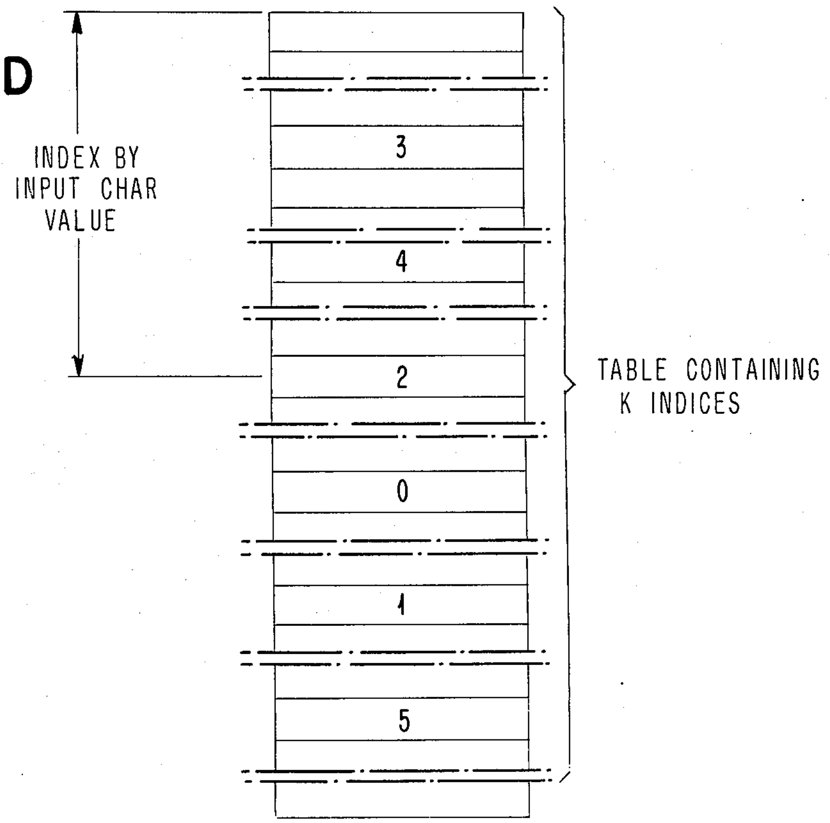

(TIMING DIAGRAM)

FIG. 5A (ADDER INPUT CONTROLS)
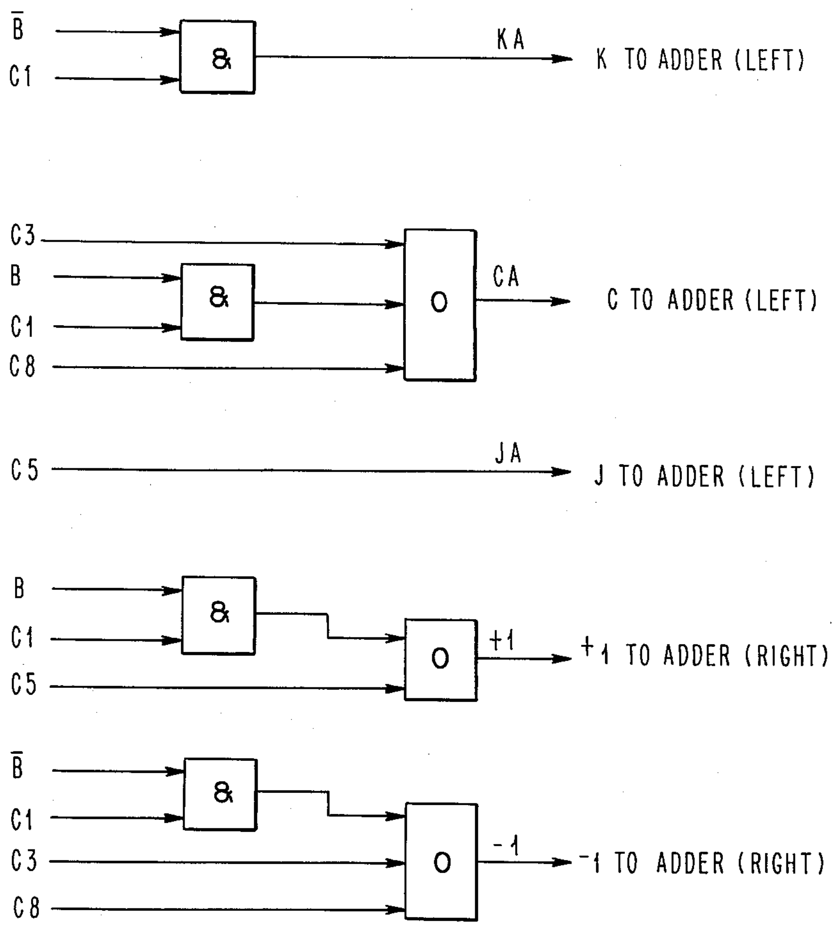
FIG. 5B (ADDER OUTPUTS)
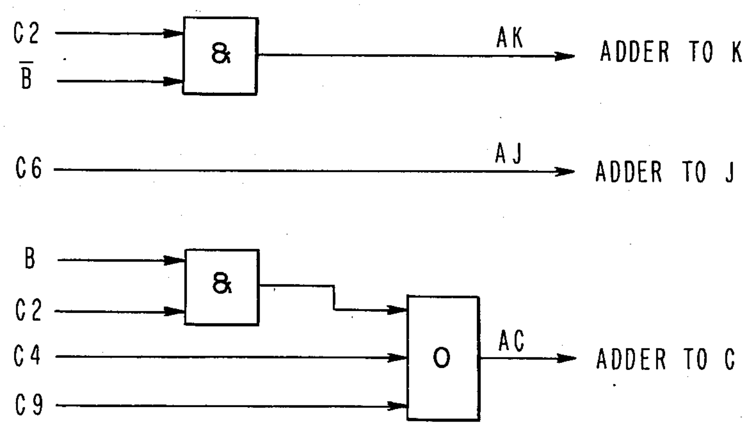

( CLOCK CONTROLS ) FIG. 5C (CONT.)
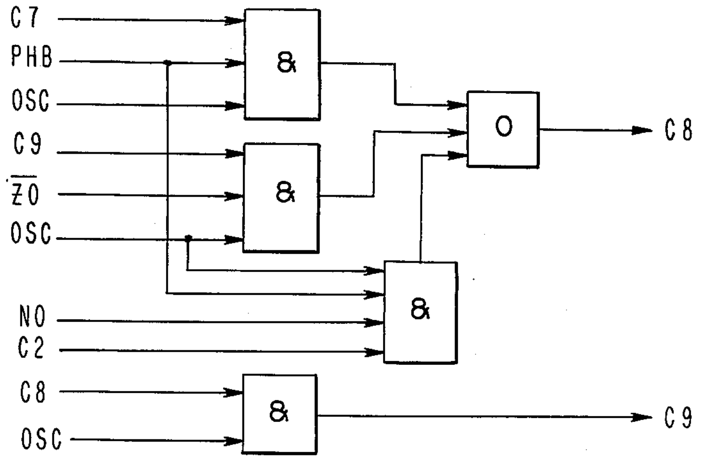
FIG. 5D
( REG P CONTROLS )
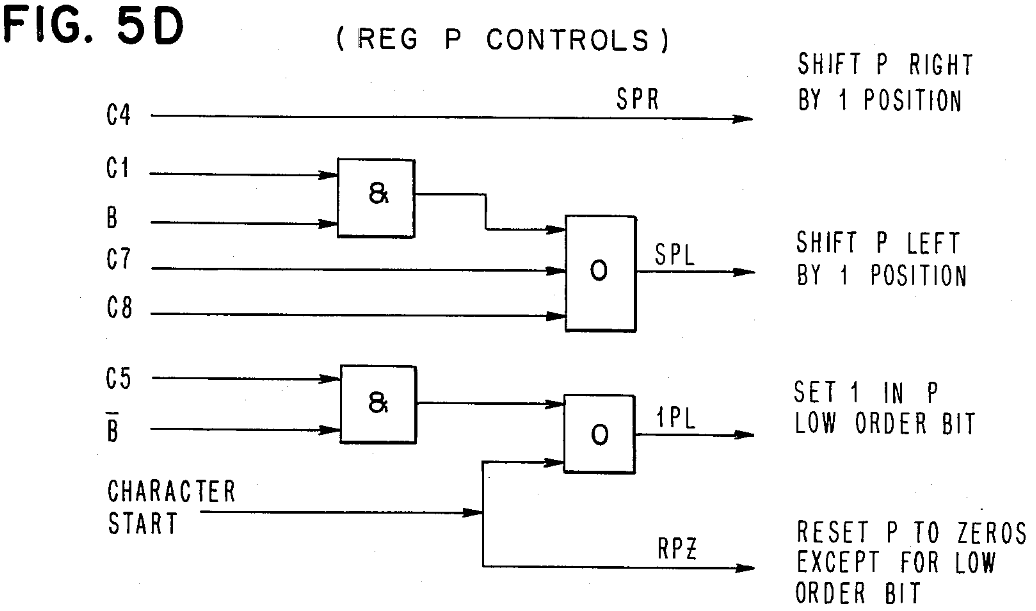
FIG. 5E
( GENERAL CONTROLS )
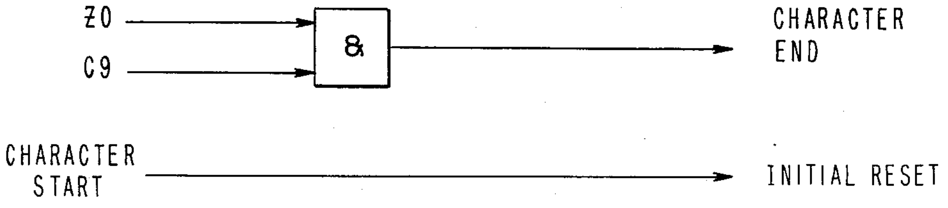

MINIMAL REDUNDANCY ENCODING METHOD AND MEANS

This is a continuation, of application Ser. No. 213,604 filed Dec. 29, 1971 and now abandoned.

This invention relates generally to a method and means for minimal redundancy encoding of data into a set of variable-length characters, which may have any predetermined bit configuration according to any predetermined binary tree structure.

PRIOR ART

The prior art includes such works as "Fundamental Algorithms, The Art of Computer Programming" by D. E. Knuth published in 1968 by Addison-Wesley Publishing Company, "Automatic Data Processing" by F. P. Brooks and K. E. Iverson, published by Wiley, and "A Programming Language" by K. E. Iverson published by Wiley, all of which are widely being taught in many universities to students working toward B. S. degrees in Computing Science; therefore they must be considered current average skill-in-the-art tools in the digital computer arts.

The terminology used in this specification is similar to the terminology used in these works and in the journal of the ACM.

The art also includes the following U.S. patents and application: U.S. Pat. No. 3,694,813 entitled "Method of Achieving Data Compaction Utilizing Variable Length Dependent Coding Techniques"; U.S. Pat. No. 3,701,108 entitled "Code Processor for Variable-Length Dependent Codes" and Ser. No. 119,275 "Method of Decoding a Variable Length Prefix Free Compaction Code" each having been invented by L. S. Loh, J. H. Mommens, and J. Raviv and assigned to the same assignee as the subject invention.

THE DEFINITION TABLE in U.S. patent application Ser. No. 136951 is included herein by reference.

INTRODUCTION

In order to enable the reader to better understand the invention described and claimed in this specification, an understanding of the representation of the minimal redundancy encoding is essential. This is best gained by understanding the correspondence between character encoding and a binary tree. This is discussed later herein in reference to FIGS. 1A, 1B and 1C preliminary to describing the embodiments of the subject invention.

OBJECTS AND FEATURES

Objects and features of this invention are:

1. To provide a method for utilizing a minimum size bit representation of a binary tree comprising a sequence of bits in which each bit position represents a vertex in the tree identified as an inner vertex or sink (i.e. 1 or 0, respectively) and the bit sequence represents the vertices in their left list order in the binary tree.

2. To provide a hardware system which can execute the method in 1.

3. To provide a method and hardware for encoding input characters into variable length output characters, which can be minimially redundant.

4. To provide a method and system for generating the path vectors in a binary tree by only using the bit representation in 1 preceding, in which each path vector can be an output character.

5. To provide a method and means for generating a path vector to a sink specified by a particular zero bit in a bit representation of a binary tree by serially scanning the bit representation, in which the particular zero bit is a specified number of zero bits between the beginning of the bit representation and the particular zero bit.

6. To provide a method and means for correlating the characters in a character set to respective sink bits in a binary tree represented as described in 1 preceding.

7. To provide a method and means in which the translation entity is easily changed to different encodings by only changing the hardware or field entity containing a bit representation of the binary tree.

DEFINITION OF THE DRAWINGS

FIGS. 1A, 1B, 1C and 1D provide respectively a binary tree structure, a sink index related byte code table, a bit string T representing the binary tree in FIG. 1A, and a translate table for translating input characters into K indices.

Figure 5C:
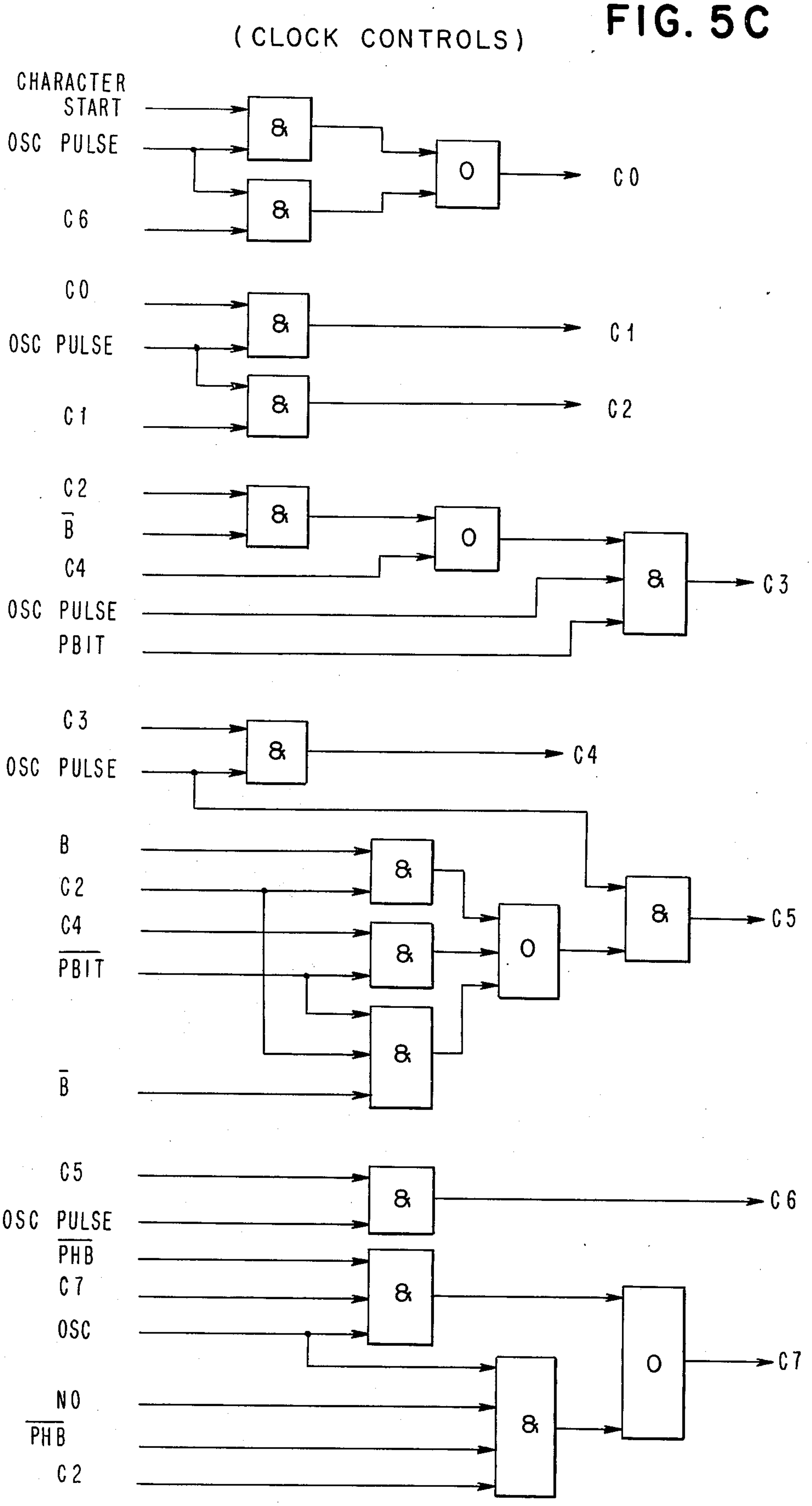

FIG. 5A illustrates adder input controls; FIG. 5B illustrates adder to register controls; FIG. 5C shows the clock controls; FIG. 5D illustrates the register P controls, and FIG. 5E shows general controls used in the data path of FIG. 3A.

The most significant symbols used in the method embodiment to be described herein are provided in the following:

SYMBOL TABLE

P : A path vector register or field.

K : The sink index (i.e. sequence number) representing an input character to be encoded. During the encoding process, K is decremented to zero in order to locate the 0 sink bit it represents in register T.

T : A register or field containing a binary tree vector, in which a 1 is an inner vertex and a 0 is a sink arranged in the left list order.

J : Index (i.e. position) of current bit in T.

C : number of low order significant bits in register P, i.e. the number of bits in the path vector in register P.

B : Bit T[J], which is the bit in register T at index J.

BINARY TREE REPRESENTATION

The invention uses a binary tree representation of a code translation, which is known in the art; an example of a code translation tree is shown in FIG. 1A in which the binary tree comprises a plurality of vertices A through K. Vertex A is the source of the tree, and its sinks are vertices C, E, F, H, J and K. The inner vertices of the tree are the non-sink vertices, including the source; in FIG. 1A the inner vertices are A, B, D, G, and I.

The path vector to any sink is the inner vertex direction sequence to that sink; that is the exit direction from any vertex to the next is 0 if its left edge is taken and 1 if the right edge is taken. For example in FIG. 1A, the path vector to sink F is 011, and the path vector to sink C is 00.

The translation characteristics of the tree in FIG. 1A are obtained by relating each of the sinks to a particular character in a character set. FIG. 1B shows an example of relating six eight-bit characters to the six sinks C, E, F, H, J and K, which are respectively sequence numbered in FIG. 1A in left list order, i.e. 0, 1, 2, 3, 4 and 5, respectively. Any input bit code, or input character, may correspond to any sink, and the eight bit byte codes in FIG. 1B are chosen arbitrarily. It is well-known in the art that a binary tree can be used to represent a minimal redundancy encoding of any character set, such as BCD, EBCDIC, USASCII, etc.

The invention utilizes a further representation of the binary tree in the form of a bit string T which is obtained by a left list scan of all vertices in the binary tree. The bit string T is generated by inserting a 1 or 0 as the next bit in the string according to whether the next vertex in the left list scan is an inner vertex or a sink, respectively. The left list scan of the vertices in FIG. 1A encounters the vertices in the order A, B, C, D, E, F, G, H, I, J and K respectively. FIG. 1C represents the generation of bit string T in this example, in which it is seen that a 1 corresponds to the inner vertices and 0 corresponds to the sinks.

Also in FIG. 1C, the sinks (i.e. the 0's) are numbered 0, 1, 2, 3, 4 and 5 respectively from left to right, and this number for any sink is called its K number. FIG. 1B correlates the K numbers to the respective sequence numbers for bytes shown therein. Thus given the sequence number for a byte in FIG. 1B, a sink bit can be found in the tree in FIG. 1A having a corresponding K number.

The process of finding the sequence number for each input character can easily be done by prior art methods. For example, in the EBCDIC code the binary content of each character also is its sequence number. With other codes a character sequence number can easily be obtained using the Translate (TR) instruction on an IBM S/360 Data Processing System to operate on a table as shown in FIG. 1D. In FIG. 1D, the value of each input character in an index into the table at which an entry is found containing the corresponding sequence number with an inverse relationship to that explained in regard to FIG. 1B. The input data to the embodiments herein is the corresponding sequence number fetched from the table in FIG. 1D in response to execution of a TR instruction using the original input character. The generation of the sequence number is not part of this invention, which begins with the receipt of electrical signals representing the sequence numbers of the inputted characters.

The process of translation from an original code to sequence numbers is of course avoided when the input character code also represents the sequence code, e.g. EBCDIC code, which occurs when the collating sequence of the original character set is determined by the binary values of the encoded characters in the set.

If a scan is made of the bits in T beginning with its leftmost bit, it will be noted that as long as 1 bits are oncountered, the scan corresponds to a left leg of a tree in FIG. 1A which ends when the first 0 (i.e. sink) bit is encountered.

The next bit after the 0 bit corresponds to the paired successor with the sink, which is the source of the right subtree of the last inner vertex sensed in T, and the scan continues in the right subtree to its leftmost sink, etc., until the entire tree is scanned. Left list tree scans, per se, are well-known in the graph theory and computer arts.

EMBODIMENTS

Figure 2:
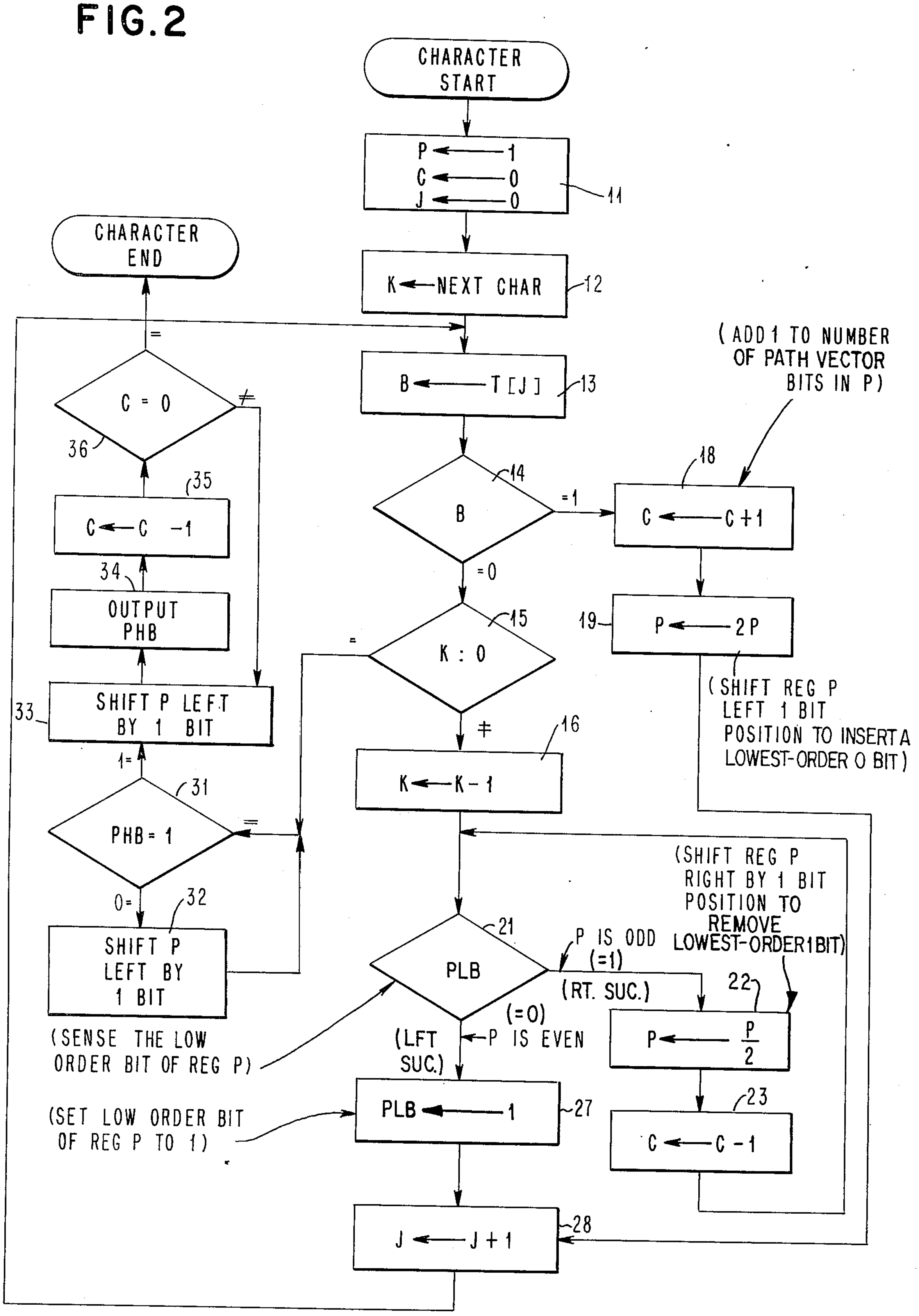
FIG. 2 is a flow diagram representing a method embodiment of the invention.

The hardware embodiment is shown in FIGS. 3A, 3B and 5A through 5E. The clock controlled operations in this embodiment are shown in the timing diagram in FIG. 4 which is self-explanatory. FIG. 2 provides a precise summary of fundamental operating relationships found in using the invention.

Figure 3A:
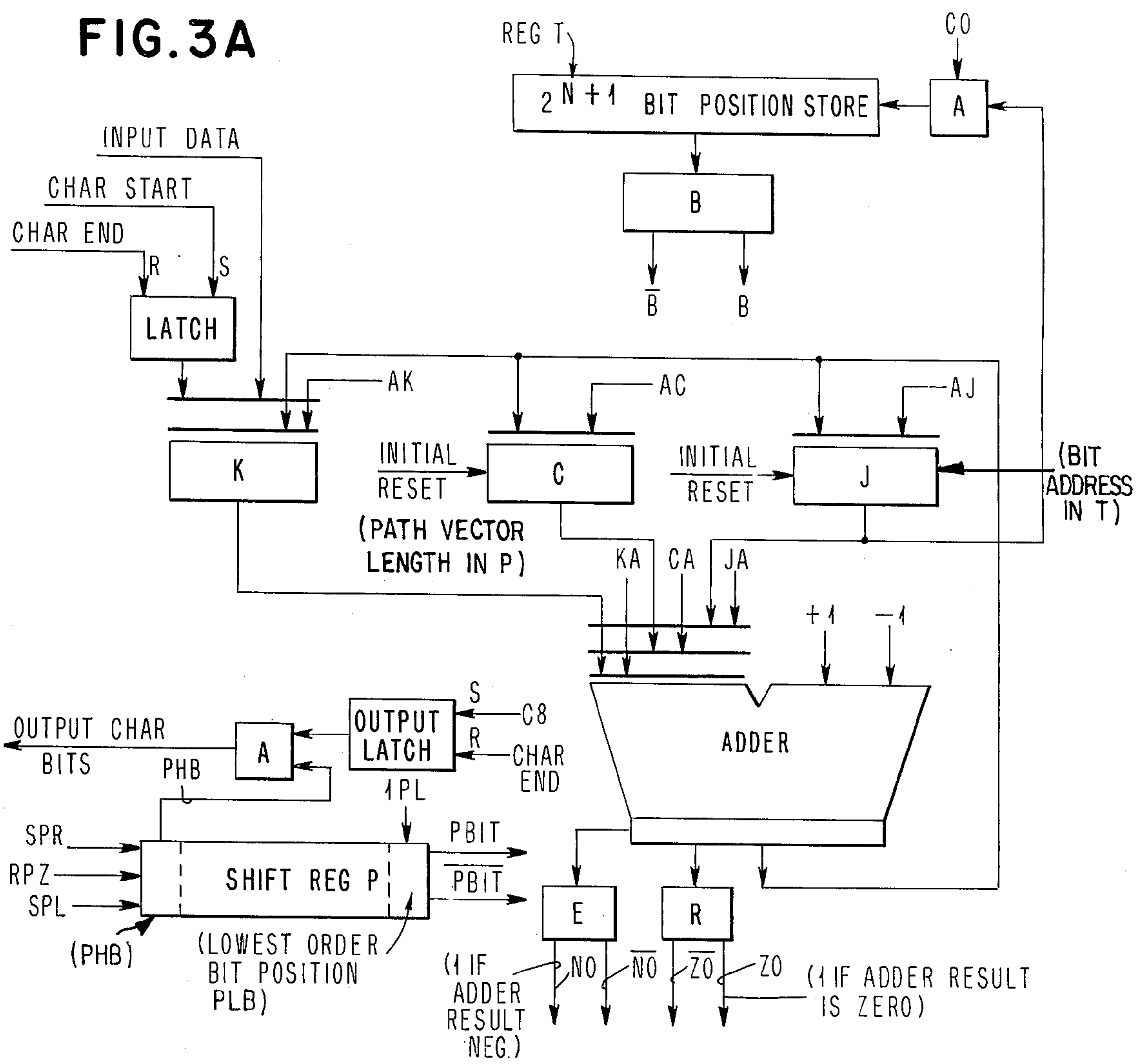
FIG. 3A shows a data bit hardware embodiment of the invention.
Figure 3B:
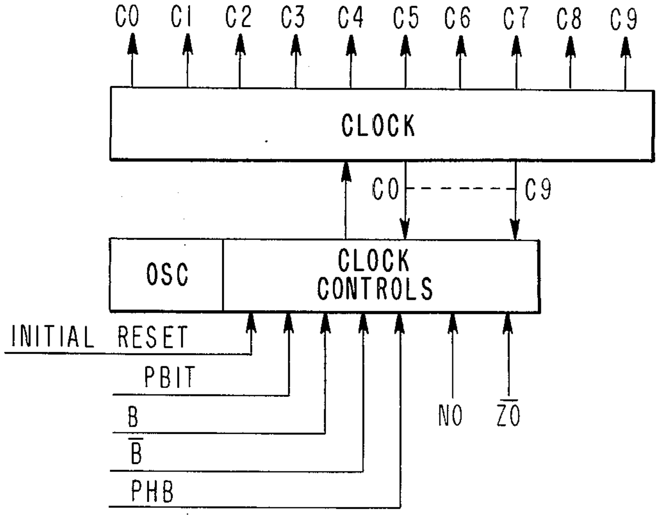
FIG. 3B illustrates the general clocking hardware for the embodiment in FIG. 3A.
Figure 4:
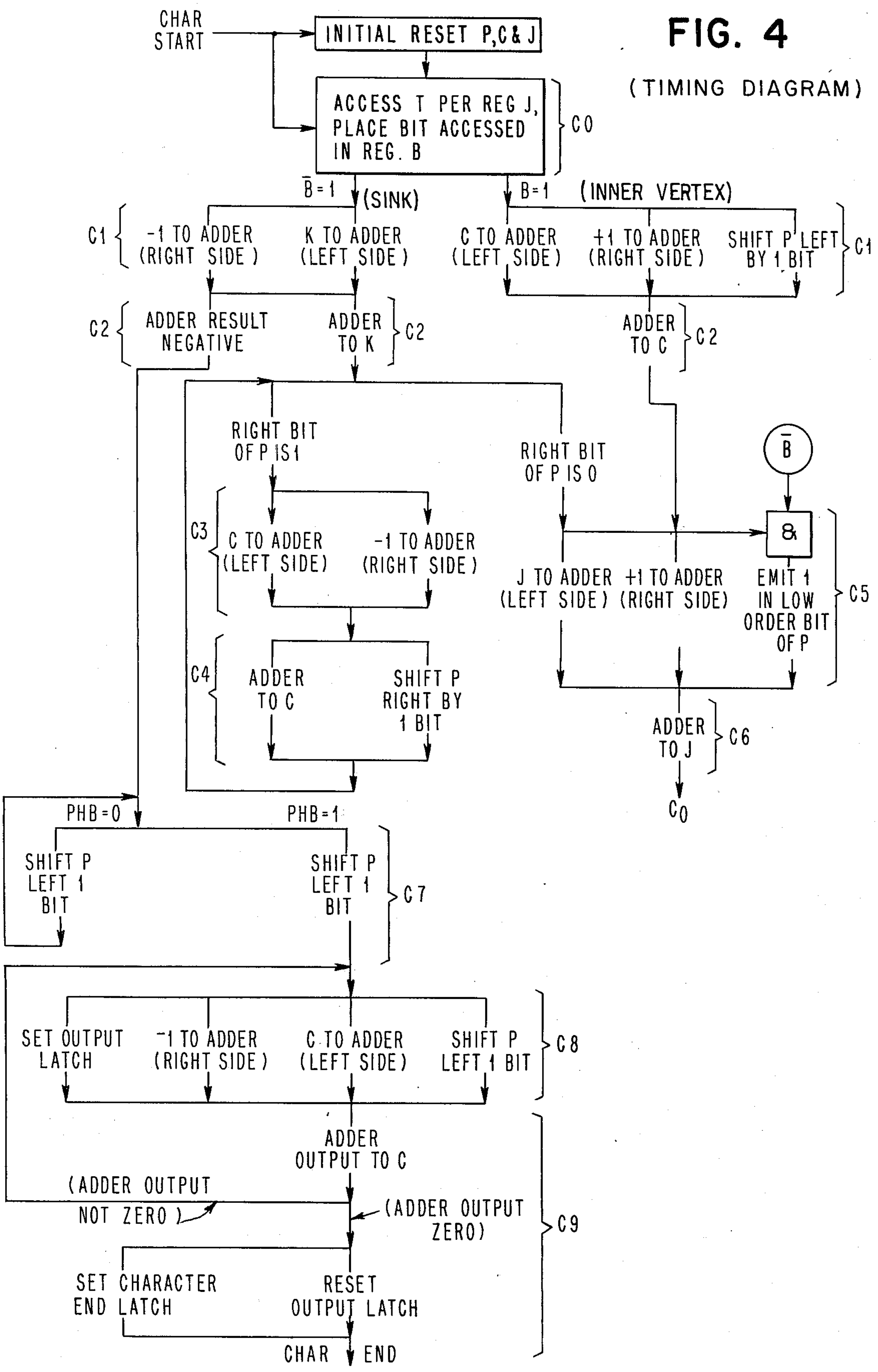
FIG. 4 illustrates a timing diagram for signal transmission in the data path shown in FIG. 3A.

In FIG. 3A a register T contains electrical signals forming the binary tree bit sequence T, which can have the electrical state accessed at any bit position J, as determined by a bit position location address in a register J. The electrical bit sequence in T is scanned under control of the current input character index electrical signal in register K for making a trace to the corresponding sink bit, during which electrical signals forming a corresponding binary tree path vector are generated in a shift register P to represent the current input character. When a sink bit is found during the trace of T, register P contains electrical signals forming the path vector to that sink, and a register C contains the length of the path vector (which is the number of significant low order bit signal of register P).

Register P is then shifted left until the high order bit of the path vector is in the high order bit position of register P. Then the path vector bit signals currently in P are serially outputted while counting down register C, until register C contains zero. Since all minimal redundancy encodings are self-defining as explained in the previously cited references, the number of bits in each output character is determined by its sequence of output bits, and the length need not be transmitted separately.

As shown in step 11 in FIG. 2, initially counter C, and register J are each electrically set to zero state, shift register P is set to a one state in its lowest-order position (PLB), and in step 12 register K is electrically set to the sequence number of the current input character, which also is the index of the sink bit in T which represents the current input character, which is to be encoded.

Scanning commences in step 13 at first bit position in T, i.e. T[0] which is the highest-order (leftmost) bit position in register T in FIG. 3A. The electrical state of bit T[0] is put into register B which always receives the current bit being examined in T. If step 14 finds the current bit in B has a 1 electrical state, it indicates that its represented vertex is an inner vertex, and that the bits in T immediately following the current bit (i.e. to its right) correspond to the left subtree of that inner vertex. If the next bit of T has a 0 electrical state, it represents a sink in that left subtree and the path vector bit signal in P for the current inner vertex has a zero state. Then register P is shifted left by one bit position in step 19, causing a zero bit state to appear in its lowest-order (rightmost) bit position PLB to represent the lowest order bit of the path vector. The path vector length counter C also in incremented by one in step 18, and scanning of T continues by accessing and testing the electrical state of the next bit position in register T. Register J is incremented by one in step 28 for addressing the next bit in T, which now becomes the current bit B, and the process goes back to step 13 for accessing the next bit T[1], etc..

If the current bit B is found by step 14 to be a zero, and if step 15 finds that register K contains an all zero state, the process serially outputs the path vector bits, i.e. the rightmost C number of bits in register P in steps 31 through 36. Steps 31 and 32 shift register P to the left until a one bit appears in the high order bit position of P. The first bit of the output character is the next bit in P. Steps 33 through 36 successively shift P left and output each bit, until register C has been counted down to zero, which signals that the encoding process terminates for the current input character.

If the current bit B in T is a zero, and register K is not zero (per steps 14 and 15), step 16 subtracts one from the content of register K, thus reducing the number of sinks remaining to be scanned by 1. Then step 21 tests the electrical state of the last path vector bit in register P, and if it has a zero state, P is even, to indicate the current sink B is a left successor of its predecessor, but is not the sink of interest because K is not zero. In this case, the next subtree whose source is the successor paired with the current sink must be investigated because the bits in T represent a left list scan of the tree. To do this, in step 27 a 1 state is emitted into the low-order bit position PLB in register P to take the scan into the next subtree, and step 28 increments register J by one, so that scanning continues with the next bit of T, which must begin the next subtree.

If step 21 finds the last path vector bit has a 1 state, then P is odd, this indicates that the current sink B represents a right successor of its predecessor, but the current sink is not the sink of interest, i.e. it is not sink K. since the current sink B in not the last one in the current scan of T, and both subtrees of the current sink's predecessor have been scanned, the path vector to sink K cannot represent a path through the current sink's predecessor. Therefore the path vector is truncated on the right by step 22 shifting the path vector to the right by one bit position; and one is subtracted from the path vector length register C to reflect this bit is no longer in the path vector being formed. After the truncation, step 21 is again entered to test the new last bit of the path vector P; if it is a one, then the corresponding inner vertex is a right successor; but since it is not in the path to the sink to be encoded, its predecessor is also not on the path to the sink to be encoded, because both the predecessor's left and right subtrees have been scanned. Accordingly step 22 is again entered and register P is shifted right again, and the path vector length counter C again is decreased by one step 23. This process of right shifting register P and subtracting one from the path vector length counter continues until the last bit of the truncated path vector is a zero.

In the basic scanning operation, when the last bit of the current path vector in P is a zero (i.e. step 21) then the vertex corresponding to it is a left successor of its predecessor. Hence the left subtree of its predecessor has been scanned, but the right subtree of its predecessor has not been scanned. To scan the right subtree, the last bit of the path vector is set to 1, and scanning continues with accessing the next bit in T.

During the iteration for each next bit T[J], step 16 decrements the K count by one, so that when the count reaches zero, the current bit T[J] which has a zero value is the correct bit being sought in T and the path vector currently existing in register P is the minimal redundancy encoding for the input character represented by the K inputted in step 12. Step 15 senses the ending conditions for the current character when K is decremented to zero, and its equal exit is taken to step 31 which is the beginning of the outputting steps, as described previously.

After the outputting ends for the current character, the method can start for the next inputted character.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for generating a set of electrical signals representing a minimal redundancy code from inputted electrical signals representing a sequence position of a current input character in a character set, comprising a clock device generating electrical timing signals, a scanable article in said apparatus formed with a sequence of bit positions, in which each bit position is settable to one of two electrical states, one electrical state being an inner vertex state and a second electrical state being a sink state, wherein the sequence of said electrical states in the bit positions of said scanable article can indicate a left list scan of minimal redundancy binary tree in which the path vectors represent the output character codes, means for sensing the electrical state of each bit position in said scanable article sequentially from a starting bit position under control of said electrical timing signals, means for counting the sink states electrically sensed by said sensing means to generate a sink count, a register device receiving a "zero" bit electrical state in a low-order bit position when an inner vertex state is detected by said sensing means to thereby increase the length of a current path vector in said register device by one bit position, means for detecting the electrical state of the bit positions in the current path vector in said register device, beginning with its lowest-order path vector bit position, when a sink state is detected by said sensing means, means for deleting from the current path vector in said register device each electrical "one" bit state found by said detecting means to be contiguous from the lowest-order bit position in the current path vector, the path vector remaining in said register device having an electrical "zero" state in its lowest-order bit position, means for changing the electrical state of the lowest-order bit position in said path vector in said register device to an electrical "one" bit state, and means for outputting the path vector setting in said register device when the sink-count in said counting means reaches an electrical state controlled by the sequence position for the current input character.

2. Apparatus as defined in claim 1, in which said counting means includes the further means of initially setting the counter means to an electrical state representing the sequence number for the current input character, means for altering the electrical state in said counter means by a one-count for each electrical sink state sensed by said sensing means, and electrically signalling said outputting means to provide an output character signal when said counter means has reached a predetermined state.

3. Apparatus as defined in claim 1 in which said register device is a shift register, comprising a control circuit for transferring from said clock device a high-order-direction shifting pulse to said shift register, and for transferring a low-order direction shifting pulse to said shift register to truncate its lowest-order bit upon said detecting means detecting each contiguous low-order "one" bit in the shift register, and said changing means transferring a timing signal from said clock device to set an electrical "one" state into the lowest-order position of said shift register after transfer of a last of said low-order direction shifting pulse.

4. Apparatus as defined in claim 2 in which said counting means, comprises a counter device for indicating the number of bit positions currently comprising said path vector in said register device, a control circuit receiving output signals from said clock device and from said scanable article and transferring an incrementing electrical pulse signal to said counter device when said scanable article outputs an inner vertex state, or transferring a decrementing electrical pulse signal to said counter device when said scanable article outputs a sink state, whereby said counter device contains an electrical signal that indicates the number of bit positions in said register devices which are set to bit states comprising said path vector.

* * * * *